United States Patent [19]

Roddy et al.

[11] 4,123,943

[45] Nov. 7, 1978

[54] METHOD AND APPARATUS FOR NONDESTRUCTIVE ULTRASONIC MEASURING OF CAST ENGINE CYLINDER WALL THICKNESS

[75] Inventors: Patrick Roddy, Chalmsford; George W. Downes, Datchworth Knebworth; John V. Searle, London; Terence W. Bregazzi, Enfield, all of England

[73] Assignee: Ford Motor Company, Dearborn, Mich.

[21] Appl. No.: 765,166

[22] Filed: Feb. 3, 1977

[30] Foreign Application Priority Data

Feb. 6, 1976 [GB] United Kingdom ............... 04676/76

[51] Int. Cl.² ............................................ G01N 29/00
[52] U.S. Cl. ...................................... 73/623; 73/597
[58] Field of Search ................... 73/67.7, 67.8 S, 67.9, 73/597, 615, 619, 622, 623

[56] References Cited

U.S. PATENT DOCUMENTS

| 3,636,778 | 1/1972 | Huffstetler | 73/622 |
| 3,808,879 | 5/1974 | Rogers | 73/67.9 |
| 3,828,609 | 8/1974 | Furon et al. | 73/67.8 S |
| 3,896,662 | 7/1975 | Camp et al. | 73/67.8 S |
| 3,930,404 | 1/1976 | Ryden | 73/67.9 X |
| 4,008,603 | 2/1977 | Paulissen | 73/67.8 S |

*Primary Examiner*—James J. Gill
*Attorney, Agent, or Firm*—Peter Abolins; Keith L. Zerschling

[57] ABSTRACT

An ultrasonic measuring technique and apparatus are disclosed. The method and apparatus are intended to measure wall thickness of bodies such as internal combustion engine cylinder walls prior to machining thereof. The body is immersed in a coupling fluid. An ultrasonic signal is generated within the cylinder bore and signal reflections from the inner and outer wall surfaces are sensed. High frequency pulses are counted between the occurrence of a pulse and receipt of the first and second reflected pulses. The count is adjusted for differences in the velocity of sound in the different media.

1 Claim, 8 Drawing Figures

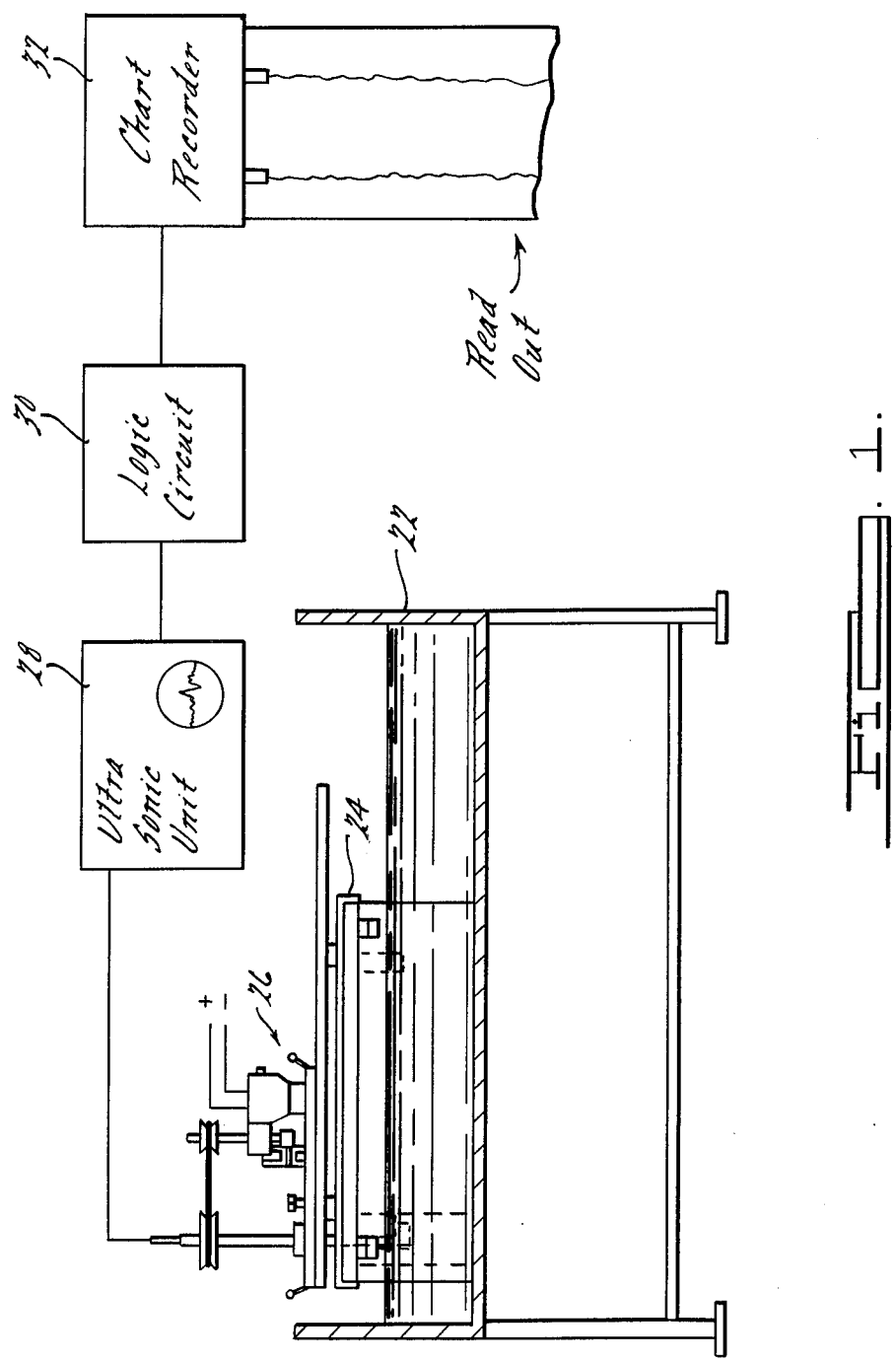

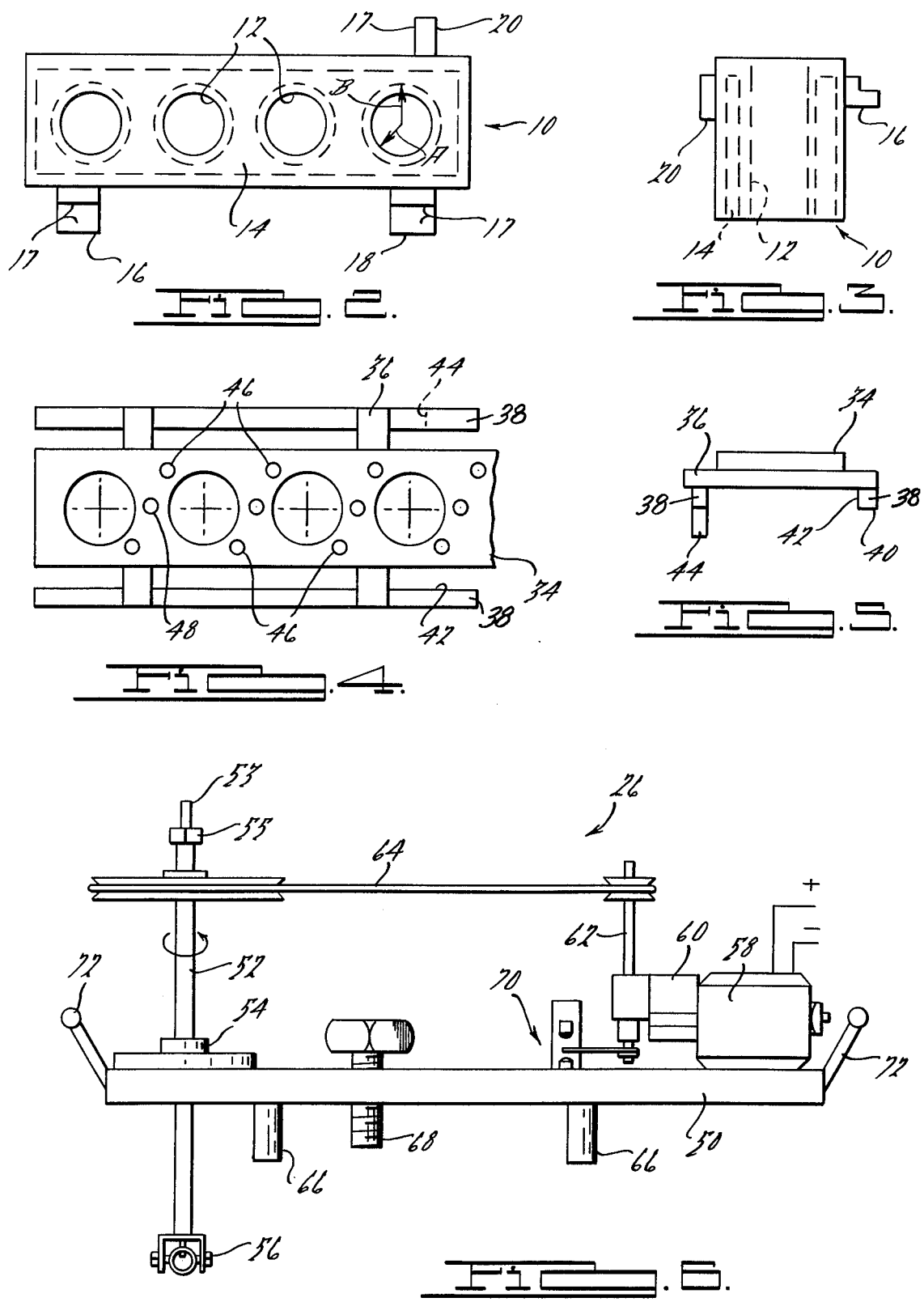

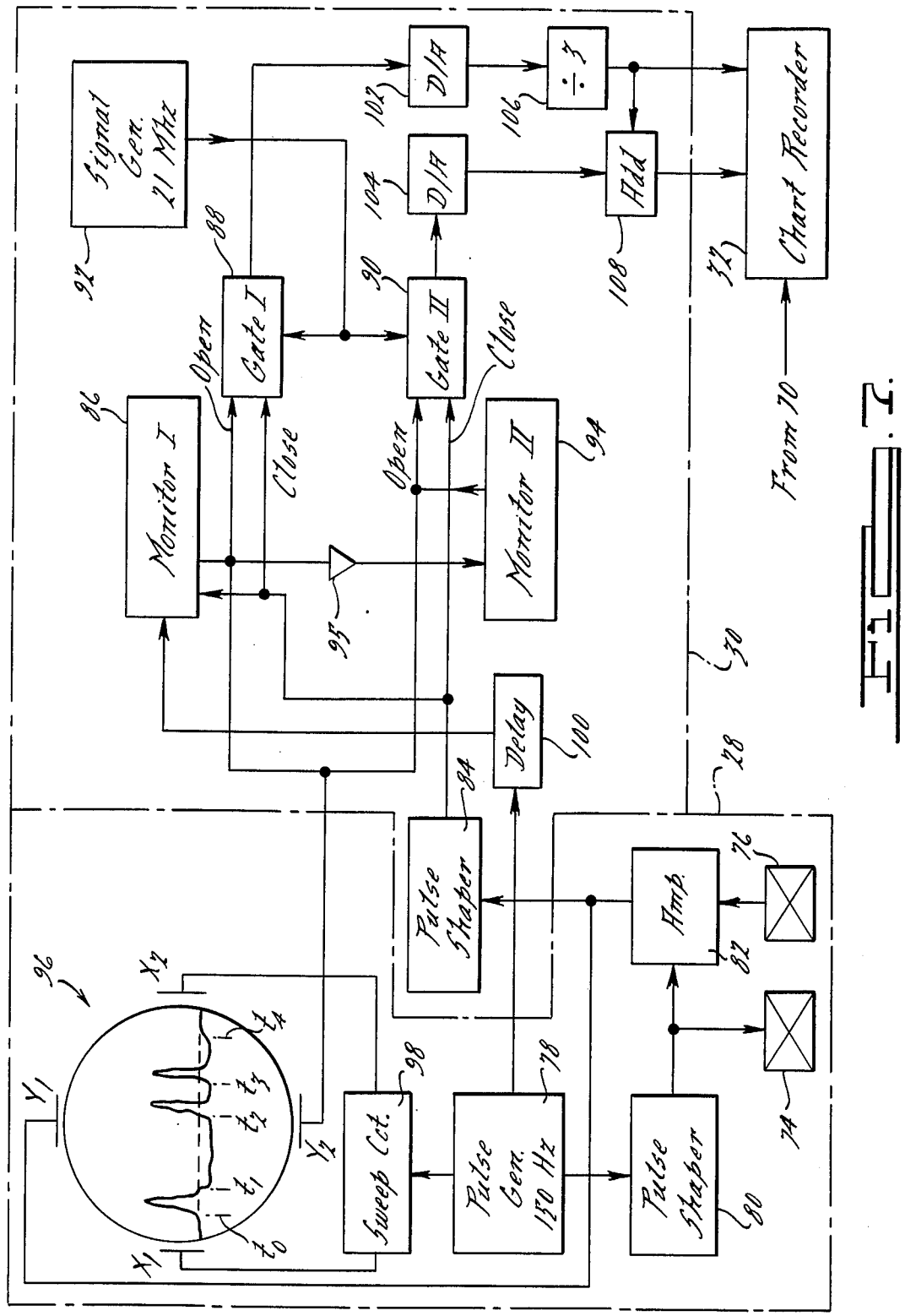

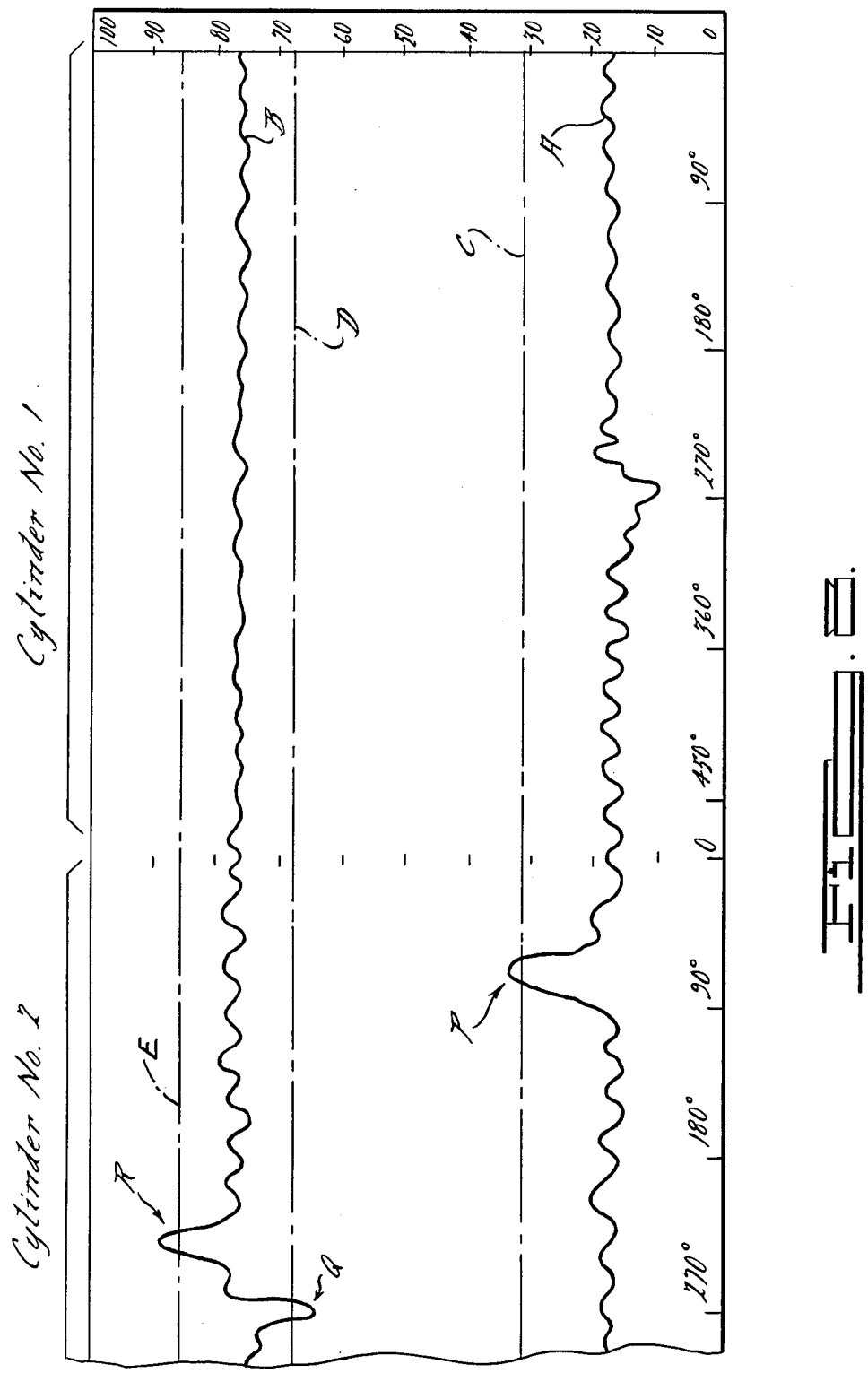

METHOD AND APPARATUS FOR NONDESTRUCTIVE ULTRASONIC MEASURING OF CAST ENGINE CYLINDER WALL THICKNESS

BACKGROUND OF THE INVENTION

1. Field of the Invention

This invention relates to ultrasonic measurement, and is of particular use in measuring inaccessible surfaces, for example measuring the cylinder wall thickness in water cooled internal combustion engines.

2. Description of the Prior Art

Cylinder blocks, i.e., for internal combustion engines, are usually cast, as from iron, using mold cores to define the cylinder bores within an engine block. The blocks are subsequently machined on automatic apparatus, this including machining of the cylinder bores to a suitable finish for the pistons. In a known arrangement, reference surfaces are machined on the block after casting to provide a datum position for the subsequent automatic machining. These reference surfaces are positioned by reference to a predetermined point on the casting and, owing to minor errors in the placement or movement of the cylinder mold cores prior to completion of casting; may not give an exact reference for machining the cylinder bores which may therefore be machined eccentrically in relation to the center of the mold core. In extreme cases the cylinder bores may have a non-machined strip, or may be over machined at one side giving a dangerously thin portion of cylinder wall.

One object of the present invention is to provide an improved method of and apparatus for examining articles such as cylinder block castings. A more general object is to provide an improved form of ultrasonic testing.

SUMMARY OF THE INVENTION

The invention accordingly provides a method of ultrasonic testing of an article having two spaced surfaces or walls, comprising immersing the article in a coupling fluid, directing a pulse of ultrasonic energy towards the article from a location spaced therefrom, detecting a first reflected pulse from one of said surfaces, detecting a second pulse from the other of said surfaces, measuring the time interval between the transmitted pulse and the first reflected pulse and between the first and second reflected pulses, and multiplying one of said time intervals by a factor representing the ratio of sonic velocity in the coupling medium and article respectively, to obtain signals representing the distance between said location and the first surface or wall and between the first and second surfaces or walls.

The invention also provides ultrasonic measuring apparatus comprising an ultrasonic transducer means, a pulse generator coupled to the transducer means for producing periodic ultrasonic pulses, and logic means for deriving from reflected pules from front and rear faces of a solid object the spacing of said front and rear faces from the transducer means, the logic means including a first timing circuit adapted to provide a signal indicative of the time elapsed between transmission of the transmitted pulse and receipt of the first reflected pulse, a second timing circuit adapted to provide a signal indicative of the time elapsed between receipt of the first and second reflected pulses, and a circuit for multiplying one of said signals by a factor representing the ratio of sonic velocities in the material of an object under examination and in the medium separating the transducer means from said object.

BRIEF DESCRIPTION OF THE DRAWING

An embodiment of the invention will now be described, by way of example, referring to the drawings, in which:

FIG. 1 is a general side view, partly in section and partly in block diagram form, of apparatus according to the invention;

FIG. 2 is a diagrammatic plan view of a cylinder block;

FIG. 3 is an end view of the block of FIG. 2;

FIG. 4 is a plan view of a jig;

FIG. 5 is an end view of the jig of FIG. 4;

FIG. 6 is a side view of part of the apparatus;

FIG. 7 is a block diagram of the electronic circuitry of the apparatus; and

FIG. 8 shows a chart produced by the apparatus.

DETAILED DESCRIPTION

The embodiment will be described with reference to a cylinder block for a four cylinder, water-cooled engine. As seen in FIGS. 2 and 3, the cylinder block 10 comprises four cylinder bores 12 and a water jacket 14. Each bore 12 thus has an inner wall surface located at radius A and an outer wall surface located at radius B, both radii being referenced to the center line of the respective cylinder bore. The outer wall surface is substantially surrounded by the outer wall of the engine block 10 and therefore is inaccessible for direct examination.

The cylinder block 10 also comprises lugs 16, 18, 20 which are machined to provide reference surfaces 17. Reference surfaces 17 may be used to precisely position the block in all directions in relation to automatic machining apparatus. The reference surfaces 17 are machined by reference to datum on the outer surface of the block 10 and by reference to portions of the outer cylinder walls accessible through apertures in the block.

As outlined above, the cylinder bores 12, as cast, may not be positioned precisely in the position for optimum machining as defined by the reference surfaces 17. It is therefore desirable to establish the actual relationship of the bores and particularly the surfaces of the bores to the reference surfaces and to give an advance indication of the result which could be expected of the machining to be carried out.

Referring now to FIG. 1, the apparatus according to the present invention is shown in combination with a tank 22, in which the block 10 is immersed in an acoustic coupling medium such as water. A jig 24 is positioned on the block 10 by means of the reference surfaces 17. The jig 24 mounts an ultrasonic inspection unit 26 which may examine each cylinder bore 12 in turn. Alternatively, a separate inspection unit may be provided for each cylinder bore 12. The inspection unit 26 cooperates with an ultrasonic generator and receiver circuit means 28, whose output is passed, via logic circuit 30, to a suitable readout device such as a twin-pen strip chart recorder 32.

As seen in greater detail in FIGS. 4 and 5, the jig 24 comprises a plate member 34 connected by struts 36 to longitudinal members 38. Longitudinal members 38 are precisely machined at surfaces 40, 42 and at a stop 44 to locate the jig on the reference surfaces 17. The plate 34 is apertured to correspond with the cylinder bores 12, and also has four sets of bores positioned in groups of three. Two bores 46 of each group are plain bores. The other bore 48 is screw-tapped for locating the ultrasonic inspection unit 26 as will be described.

Referring now to FIG. 6, the ultrasonic inspection unit 26 comprises a base plate member 50 on which a hollow transducer shaft 52 is rotatably mounted, for example in a bearing 54. An inner shaft 53 is slidably and rotatably received within hollow transducer shaft 52. A transducer assembly 56 is fixed to the lower end of the inner shaft 53. Shaft 53 may be rotated with the shaft 52 by an electric motor 58 via reduction gearbox 60, counter shaft 62, and belt and pulley transmission 64. The base plate member 50 carries a plurality of dowel pin members 66 for receipt within plain bores 46 and a screw member 68 for engagement with the tapped bore 48. The transducer shaft 52 is located in position on the machining center line of a selected cylinder bore 12, as defined by the reference surfaces 17, through the cooperation of dowel pins 66 and screw member 68 cooperating with their respective bores on plate 34. The axial position of the transducer assembly 56 within a cylinder bore 12 may be changed by adjusting a nut 55 engaging the screw-threaded upper end of the inner shaft 53. The ultrasonic inspection unit 26 also as a photoelectric detector 70 arranged to detect rotation of the counter shaft 62 to define the rotational position of the transducer assembly 56 within the cylinder bore. Handles 72 are provided for ease of handling. Thus, when the apparatus is set up as shown in FIG. 1, the transducer assembly 56 is set up on the theoretical center line of the selected cylinder bore 12 on which machining will take place. The remainder of the apparatus operates to measure, simultaneously, the distance from this position to the inner and outer cylinder wall surfaces. By scanning in response to rotation of inner shaft 53, the profile of the wall surfaces, around their circumference, will be determined as will now be described.

Turning to FIG. 7, the transducer assembly previously described comprises a transmitter 74 and a receiver 76 for transmitting and receiving ultrasonic energy at a selected frequency. By way of example, the transmitter 74 and receiver 76 may be a pair of matched ultrasonic crystals. The transmitter 74 is supplied by a pulse generator 78 with a relatively low pulse frequency of, for example, 150 Hz via a pulse shaping circuit 80. The resulting ultrasonic pulses are transmitted through the coupling medium to the inner surface of the wall of the selected cylinder bore 12 from which a first reflected pulse travels back to the receiver 76. The incident pulse also travels through the wall of the cylinder bore 12 to the outer surface thereof to give rise to a second reflected pulse, from the outer surface, which travels back through the wall and coupling medium to the receiver 76. It should be noted that in this example, using water as the coupling medium and iron as the body being examined, the acoustic velocity in the coupling medium is one third the acoustic velocity in the iron of the cylinder block 10.

The output of the receiver 76 is passed via amplifier 82 and pulse shaper 84 to a first monitor circuit 86 and, in parallel, to first and second gates 88, 90 respectively. The gates 88, 90 act to gate a relatively high frequency signal, for example a 21 MHz signal, produced by signal generator 92. The high frequency signal from signal generator 92 is gated by first gate 88 in response to a high signal from the first monitor circuit 86 in the time period from generation of an ultrasonic pulse from transmitter 74 until receipt of the first reflected pulse. The high frequency signal from signal generator 92 is gated by second gate 90 in response to a high signal from the second monitor circuit 94 during the interval between receipt by receiver 76 of the first reflected pulse and receipt of the second reflected pulse.

The ultrasonic generator and receiver circuit 28 also includes a cathode ray tube, C.R.T., indicated at 96. The 150 Hz output signal of the pulse generator 78 is used to trigger a sweep circuit 98 controlling the X-deflection of the C.R.T. 96. The ultrasonic generator and receiver 28 is preferably a UMG 13-3 model manufacturer by Vitosonics Ltd. of Hertford, England.

The output of the pulse generator 78 is also passed via an adjustable delay 100 to the first monitor circuit 86. The output of first monitor circuit 86 is connected to the first gate 88 and also as an input to the second monitor circuit 94 via an inverter 95. The first monitor circuit 86 operates to produce a high output signal on receipt of one input and to revert to a low output signal on receipt of a second input. First monitor circuit 86 may be, for instance, a bistable multivibrator circuit. The second monitor circuit 94 operates to produce a high output signal on receipt of an input signal and reverts to a low output signal after a fixed time. Second monitor circuit may be, for example, a monostable multivibrator.

The circuit operation for a single pulse from pulse generator 78 is therefore as follows, reference being made to the typical trace indicated on the c.r.t. 96. At time $t_0$, a signal is generated by the pulse generator 78. This signal is applied substantially simultaneously to pulse shaper 80 and to the adjustable delay 100. The signal is transmitted from pulse shaper 80 and is applied to transmitter 74. This signal is transmitted, as an ultrasonic energy burst or pulse, substantially simultaneously, by the transmitter 74. At a subsequent time $t_1$, (the interval $t_0$ plus a small increment set by the delay 100) the first monitor 86 is switched to a high output. This high output signal is coupled to the $Y_2$ deflection plate of the c.r.t. 96 to give a downward step in the base of the trace. The high output signal from the first monitor circuit 86 also opens the first gate 88 to pass the 21 MH$_Z$ signal from the signal generator 92.

As the ultrasonic pulse encounters the inner and outer wall surfaces of the cylinder bore, pulse reflections are directed back toward transducer assembly 56. The first reflected pulse is received by the receiver 76 at time $t_2$. This received pulse acts through amplifier 82 to generate a signal to close the first gate 88 and to turn off the first monitor circuit 86. The second monitor circuit 94 is turned on by the inverted output of circuit 86. The second gate 90 opens and remains open until closed by receipt of the second reflected pulse at time $t_3$. Preferably there is a short delay in the turn-off of the second monitor circuit 94 until $t_4$.

It will thus be seen that the gates 88, 90 pass the 21 MH$_Z$ signal for respective time intervals from $t_1$ to $t_2$ and from $t_2$ to $t_3$ which intervals are respectively functions of spacing from the transducer assembly 52 to the inner wall surface (distance A), and from the inner wall surface to the outer wall surface (distance B-A). The gated signals thus contain numbers of 21 MH$_Z$ pulse proportional to these distances. These values are converted to digital form by digital-analog converters 102, 104. The first analog signal is divided by a number, in the example described 3, in a division circuit to allow for the ratio of sonic velocity in the two media. The divided signal, which represents the distance from the transducer assembly 56 to the first surface is applied to drive one pen of the chart recorder 32. The divided signal also is added with the other signal in an adding circuit 108, the sum, which represents the distance from the transducer assembly 56 to the second surface, driving a second pen of the chart recorder 32.

The above is, of course, repeated for a large number of 150 $H_z$ pulses as the transducer assembly 56 is rotated through 360°. The resulting chart output is illustrated in FIG. 8. Traces A and B represent the distances A and B of FIG. 2. It should be noted that the constant introduced by the adjustable delay circuit 100 merely sets the positions of traces A and B on the chart but does not affect the relationship of trace A with respect to trace B.

These results may be interpreted directly by inserting a straight line C representing the position of the final machined surface, and a parallel line D whose spacing from C represents the minimum acceptable wall thickness. A further line E may represent a maximum projection of the casting into the water jacket. By visual analysis of the chart A it is readily apparent that at P a nonmachined area will result on the cylinder wall of cylinder number 2. It is also apparent that there is insufficient wall thickness at Q and at R there is an intrusion into the water space. These are shown as examples and would not normally occur together. The portion of the chart denoted cylinder No. 1 indicates the desired conditions for machining to achieve the preferred results without difficulty. A more direct indication of faulty bores may be obtained by feeding the signals at the recorder inputs to threshold circuits which effectively store the values of C, D and E. Signals going over the threshold values may then drive a warning device such as a bell or a light.

Other modifications are possible within the scope of the invention. The addition and division may be performed digitally and the signals then transformed to analogue. Coupling media other than water may be used, in which case the division factor would be changed accordingly. A further modification is to record the wall positions as above and use this analysis to alter the reference surfaces on the casting for optimum machining. This may be done, for example, by positioning the lines C and D on the graph with the greatest spacing which avoids nonmachined surfaces (but always giving the minimum acceptable wall thickness) and reading the optimum machining centre from the position of C.

The invention is of course applicable to the inspection of articles other than cylinder blocks, particularly where an inaccessible face is involved.

What we claim is:

1. A method of testing cylinder block castings prior to machining to determine whether or not the cylinder walls will have adequate wall thickness and be completely machined after machining including the following steps:
    (a) mounting a rotatable transducer in a selected position with respect to the cylinder block;
    (b) generating, at a relatively low frequency, ultrasonic signals from said transducer;
    (c) receiving reflected ultrasonic signal pulses from the inner and outer wall surfaces;
    (d) measuring the intervals between generation of an ultrasonic pulse and receipt of the reflected pulses from the inner and outer wall surfaces;
    (e) multiplying only the signal representative of the distance from the transducer to the inner wall surface by a factor determined as the ratio of the sonic velocity in the coupling medium divided by the sonic velocity in the material of the cylinder block to provide a modified signal;
    (f) rotating the transducer about a reference axis in each cylinder bore which will be used for machining that cylinder;
    (g) adding the modified signal representative of the distance from the transducer to the inner wall surface and the signal which is representative of the distance from the transducer to the outer wall surface;
    (h) rejecting the cylinder block if the outer wall surface distance signal falls below a predetermined value representative of minimal acceptable bore wall thickness in any one of the bores.

* * * * *